United States Patent
Jin

(10) Patent No.: US 12,399,339 B2
(45) Date of Patent: Aug. 26, 2025

(54) POSITIONING BLOCK, OPTICAL POSITIONING SYSTEM AND METHOD BASED ON POSITIONING BLOCK, AND FUNCTIONAL MODULE

(71) Applicant: JIAXING XURUI ELECTRONIC TECHNOLOGY CO., LTD., Zhejiang (CN)

(72) Inventor: Xingang Jin, Zhejiang (CN)

(73) Assignee: Jiaxing Xurui Electronic Technology Co., Ltd., Jiaxing (CN)

( * ) Notice: Subject to any disclaimer, the term of this patent is extended or adjusted under 35 U.S.C. 154(b) by 840 days.

(21) Appl. No.: 17/628,743

(22) PCT Filed: Jul. 17, 2020

(86) PCT No.: PCT/CN2020/102713
§ 371 (c)(1),
(2) Date: Jan. 20, 2022

(87) PCT Pub. No.: WO2021/013094
PCT Pub. Date: Jan. 28, 2021

(65) Prior Publication Data
US 2022/0269029 A1    Aug. 25, 2022

(30) Foreign Application Priority Data

Jul. 24, 2019   (CN) .......................... 201910669312.4
Oct. 30, 2019   (CN) .......................... 201911043079.5

(51) Int. Cl.
*G02B 7/00*   (2021.01)
(52) U.S. Cl.
CPC .................. *G02B 7/004* (2013.01)
(58) Field of Classification Search
CPC ........................................... G02B 7/004
(Continued)

(56) References Cited

U.S. PATENT DOCUMENTS 798,337    A  *  8/1905  Hammarlund
2,795,893  A  *  6/1957  Vayo .................... A63H 33/046
                                                              446/92

(Continued)

FOREIGN PATENT DOCUMENTS

CN    202046083  U  *  11/2011
CN    103885140          6/2014
(Continued)

OTHER PUBLICATIONS

[No Author Listed] [online], "Magnetic Bases," Thorlabs.com, Jan. 7, 2015, retrieved on Aug. 31, 2022, retrieved from URL <https://www.thorlabs.com/catalogpages/obsolete/2015/phm0_m.pdf>, 5 pages.

(Continued)

*Primary Examiner* — Ricky D Shafer
(74) *Attorney, Agent, or Firm* — Fish & Richardson P.C.

(57) ABSTRACT

Provided are a positioning block, an optical positioning system and method based on a positioning block, and a functional module. The positioning system includes a bottom board with a horizontal upper surface and at least one backrest body having a straight positioning side, and several positioning blocks for carrying and positioning an optical assembly. A movable carrying board may be further added to the bottom board. Positioning of vertical direction is implemented by closely attaching the bottom of the positioning block to the bottom board or carrying board, and positioning of horizontal direction is implemented by attaching the side surfaces of the positioning block to the positioning sides of the backrest bodies. According to different light path designs, an optical functional assembly is carried on a square block for positioning; the center points of all optical assemblies are enabled to be at a same height through a connection structure, and a light emitting assembly enables emitted light to be parallel to the side surface and the bottom surface of the positioning block through mechanical adjust- (Continued)

ment, and the center points of other optical assemblies are at the same height as the emitted light. In this way, basically accurate positioning of an optical system can be achieved.

11 Claims, 3 Drawing Sheets

(58) Field of Classification Search
USPC .......................................................... 359/503
See application file for complete search history.

(56) References Cited

U.S. PATENT DOCUMENTS

| | | | |
|---|---|---|---|
| 3,095,668 A * | 7/1963 | Dorsett | G09B 1/38 |
| | | | 12/146 B |
| 6,437,929 B1 | 8/2002 | Liu | |
| 10,884,200 B2 * | 1/2021 | Suzuki | G02B 6/4214 |
| 2005/0025430 A1 | 2/2005 | Bhagavatula et al. | |
| 2009/0266967 A1 * | 10/2009 | Allen | G01M 11/04 |
| | | | 248/512 |
| 2012/0224373 A1 | 9/2012 | Snijder et al. | |
| 2015/0068310 A1 | 3/2015 | Stecker et al. | |
| 2015/0362694 A1 * | 12/2015 | Nguyen | G02B 6/4226 |
| | | | 248/125.7 |
| 2018/0056205 A1 * | 3/2018 | Lu | F21L 4/02 |
| 2019/0086619 A1 * | 3/2019 | Chen | G02B 19/0028 |

FOREIGN PATENT DOCUMENTS

| | | |
|---|---|---|
| CN | 205300528 | 6/2016 |
| CN | 207271294 | 4/2018 |
| CN | 208125059 | 11/2018 |
| CN | 110286458 | 9/2019 |
| CN | 110618512 | 12/2019 |
| EP | 2384797 | 7/2013 |
| GB | 2415792 | 1/2006 |
| JP | 11287926 A * | 10/1999 |

OTHER PUBLICATIONS

EP Search Report in European Appln. No. 20843875.4, dated Jul. 29, 2022, 8 pages.
International Search Report in International Appln. No. PCT/CN2020/102713 dated Oct. 22, 2020, 8 pages.

* cited by examiner

POSITIONING BLOCK, OPTICAL POSITIONING SYSTEM AND METHOD BASED ON POSITIONING BLOCK, AND FUNCTIONAL MODULE

CROSS REFERENCE TO RELATED APPLICATIONS

This application is a national phase filing under 35 U.S.C. § 371 of International Application No. PCT/CN2020/102713, filed Jul. 17, 2020, which claims priority from Chinese Application No. 201911043079.5, filed Oct. 30, 2019 and Chinese Application No. 201910669312.4, filed Jul. 24, 2019. The entire contents of the prior applications are incorporated herein by reference in their entirety.

TECHNICAL FIELD

The present invention belongs to the field of optical technologies, and relates to systems and methods for positioning various optical functional assemblies in a light path, and in particular to an optical positioning system and method based on a positioning block and a functional module.

BACKGROUND

At present, when an optical system is constructed in a laboratory, it is required to adjust a light path using a multi-dimensional adjusting bracket. In some complex optical systems, a huge amount of workload is required to construct a light path. Furthermore, due to too high degree of freedom of the light path, the system almost has no repeatability. Every time a light path structure changes, one adjustment will be required, wasting a large amount of time and labor. In order to overcome the shortcomings of the prior art, the present invention provides an optical positioning system and method based on a positioning block and a positioning block and a functional module, so as to quickly construct and position an optical functional assembly in a light path and facilitate reconfiguration.

SUMMARY

Specific descriptions are made below to the positioning block, the optical positioning system and method based on a positioning block and a functional module according to the present invention.

I. Positioning Block of the Present Invention

The positioning block of the present invention includes a bottom surface, an upper surface for carrying an optical assembly, and at least one positioning side surface.

Furthermore, the positioning block includes two positioning side surfaces perpendicular to each other.

Furthermore, the positioning block is a square block structure, and four side surfaces of the square block are perpendicular to the bottom surface. A horizontal section of the square block is a rectangle, and the horizontal sections of different square blocks are same in size or modular-designed. The modular design means that: with a square with a minimum side length as a basic unit, a plane can be designed into a rectangle or square with a length or width being integer multiples of the minimum side length. For example, the present unit is 1×1, and other modular-designed square blocks may be of 1×2, 1×3, 2×2 and the like.

The square block in the present invention is not required to be hexahedron in strict geometric sense and each corner may be a chamfer or smoothly transitioned. Therefore, it may be expressed as a multi-edge prism (for example, four lateral edges are all processed into chamfers, and it will become a geometric octagonal prism). The square blocks will belong to the present invention and its horizontal section will be regarded as rectangle as long as there are four side surfaces perpendicular to each other. The positioning block of square block structure in the present invention is called a positioning square block, or square block for short.

As a preferred solution, a magnet is embedded into the bottom surface of the positioning block.

As a preferred solution, a magnet is embedded into the positioning side surface of the positioning block.

As a preferred solution, the positioning block of square block structure is made of a magnetic material and a magnet is embedded to each of the four positioning side surfaces. Furthermore, the positions of the four positioning side surfaces for embedding the magnets are off-centered to be at left or right side, and polar directions of different embedded magnets are same.

II. Optical Positioning System Based on a Positioning Block in the Present Invention The optical positioning system includes a bottom board with a horizontal upper surface, at least one backrest body, several (at least two) positioning blocks for carrying and positioning an optical functional assembly. The bottom board is used to provide a carrying platform of the optical system, namely, a horizontal reference plane of the optical system, which is also an initial positioning in a perpendicular direction (called Z direction). The backrest body and the bottom board are integral structure or split structure, the backrest body has at least one straight positioning side for providing initial positioning of horizontal direction for the positioning blocks. The bottom surface of the positioning block may be attached to the upper surface of the bottom board, the positioning side surfaces of the positioning block may be attached to the positioning side of the backrest body, and the top of positioning block may carry the optical assembly. In the present invention, the bottom board and the backrest body are collectively called positioning plate.

When the optical system constructed herein extends only along one direction (referred to as X direction), it is only required to set an optical axis of the optical assembly on different positioning blocks to be parallel to the positioning side surfaces and equally distant from the positioning side surfaces. In this way, it can be guaranteed that, when the positioning side surfaces of different positioning blocks are attached to the positioning side of the backrest body, the optical axes of the optical assemblies on different positioning blocks are on a same perpendicular plane. As required by a light path, if the optical axes of the optical assemblies are further set to be at a same height and parallel to the bottom surface of the positioning block, the optical axes of the optical assemblies on different positioning blocks are on a same horizontal straight line.

In some light paths, the optical assembly needs to be positioned along two perpendicular directions (called X direction and Y direction). In this case, the present invention provides a backrest body having two positioning sides perpendicular to each other (X direction and Y direction). The backrest body may be a single structure or include two backrest bodies perpendicular to each other. The positioning block may have two positioning side surfaces perpendicular to each other, where one positioning side surface is parallel to the optical axis and the other is perpendicular to the optical axis. In this case, the positioning side surfaces of different positioning blocks are attached to the X direction positioning side and the Y direction positioning side of the backrest body respectively to achieve positioning of X direction and Y direction.

In the above solution, the positioning block achieves directional positioning for a light path, and a distance between different positioning blocks may be adjusted by sliding the positioning block along the backrest body. In this way, without changing the direction of the light path, the distance between the optical assemblies can be changed.

In some cases, in addition to positioning of X direction and Y direction, it is also required to achieve accurate distance positioning of the two directions. The requirements can be fulfilled by using the positioning block of square block structure, and the positioning block may be referred to as positioning square block. The bottom surface of each positioning square block may be attached to the bottom board, the side surfaces of the square block are perpendicular to the bottom surface and may be attached to the backrest body and the side surfaces of different square blocks. Top surfaces of some or all of the square blocks carry the optical functional assembly, a horizontal section of the square block is a rectangle, and the horizontal sections of different square blocks are same in size or modular-designed. Thus, the positioning side of the backrest body provides initial positioning of X and Y directions, and different positioning square blocks are attached to each other continuously to extend, thus realizing accurate distance positioning between optical assemblies, where the distance is an integer multiples of the side length of the basic square block unit in a strict sense.

When the bottom board and the backrest are not separable, a movable carrying board may be added to the bottom board. one or at least two perpendicular sides of the carrying board may be attached to the backrest body, and the bottom surface of the square block may be attached to the upper surface of the carrying board.

III. Method of Positioning an Optical System Based on a Positioning Block in the Present Invention With the bottom board or carrying board as a positioning reference of perpendicular direction (Z direction) and the backrest on the bottom board as a positioning reference of horizontal direction (X direction and/or Y direction), according to different light path designs, different positioning blocks carrying or not carrying an optical assembly are attached to the bottom board and backrest body and the positioning blocks are attached to each other. In this way, fast positioning of the light path can be achieved. According to whether the plane direction is one-dimensional positioning (single direction) or two-dimensional positioning (perpendicular X and Y directions) and whether accurate distance positioning is required, the following specific method can be implemented.

When only one-dimensional positioning is required, the positioning side surface of the positioning block is attached to a same positioning side of the backrest body. It is only required to set the optical axes of the optical assemblies on different positioning blocks to be parallel to the positioning side surface and equally distant from the positioning side surface. In this way, it can be guaranteed that, when the positioning side surfaces of different positioning blocks are attached to the positioning side of the backrest body, the optical axes of the optical assemblies on different positioning blocks are on a same perpendicular plane. As required by the light path, if the optical axes of the optical assemblies are further set to be at a same height and parallel to the bottom surface of the positioning block, the optical axes of the optical assemblies on different positioning blocks are on a same horizontal straight line. The distance between the optical assemblies may be roughly adjusted by sliding the positioning block along the backrest body.

When two-dimensional positioning is required, the optical assemblies are positioned along two perpendicular directions of the plane (X direction and Y direction). The backrest body having two positioning sides perpendicular to each other (X direction and Y direction) may be employed, and the positioning block has two positioning side surfaces perpendicular to each other, where one positioning side surface is parallel to the optical axis and the other is perpendicular to the optical axis. According to the optical path design, different positioning blocks are attached to the corresponding positions of the desired positioning sides along a desired direction. In this case, the positioning side surfaces of different positioning blocks are attached to the X direction positioning side and the Y direction positioning side of the backrest body respectively to achieve positioning of X direction and Y direction. The distance between the optical assemblies may be roughly adjusted by sliding the positioning block along the backrest body.

When both the two-dimensional positioning of X and Y directions and the accurate distance positioning of the two directions are required, this requirements can be fulfilled by the positioning square blocks. The bottom surface of each positioning square block may be attached to the bottom board, the side surfaces of the square block are perpendicular to the bottom surface and may be attached to the backrest body and the side surfaces of different square blocks. Top surfaces of some or all of the square blocks carry the optical functional assembly. In this way, the positioning side of the backrest body provides initial positioning of X and Y directions, and different positioning square blocks are attached to each other continuously to extend, thus realizing accurate distance positioning between optical assemblies, where the distance is an integer multiples of the side length of the basic square block unit in a strict sense.

With the above two-dimensional accurate distance positioning as an example, the optical positioning method of the present invention is further described. According to different light path designs, an optical functional assembly is carried on a square block for positioning; the optical functional assemblies of upper layer enable the center points of all functional assemblies to be at a same height through a connection structure, and a light emitting assembly (for example, laser and collimator and the like) enables emitted light to be parallel to one side surface and the bottom surface of the positioning square block through mechanical adjustment, and the center points of other optical assemblies are at the same height as the emitted light. Further, by adjusting an optical fiber assembly, the light will not change its position and angle after passing through the assembly. In this case, light emitted from one light emitting assembly may smoothly enter the final optical assembly such as collimator and detector after passing through several optical assemblies. Various optical functional assemblies are designed such that relative to the upper surface of the square block, the light emitting or light incidence positions have the same height and the horizontal positions are also consistent. According to the requirements of light path, several square blocks carrying the optical functional assembly are placed at the corresponding positions of the square block array on the bottom board, so as to achieve basically accurate positioning of the optical system. Some micro-adjustment structures may be added to the square blocks to make some fine adjustments to the optical functional assembly, so as to further improve the aligning coupling accuracy of the optical assemblies on different square blocks. Generally, requirements can be satisfied by using square blocks of basic units of same size. The square blocks of different sizes subjected to modular designing can satisfy more flexible requirements and can improve the positioning efficiency and accuracy. For example, when the bottom of the optical functional assembly exceeds the size of the basic unit square block, a larger square block may be adopted; when a distance between adjacent optical functional assemblies is large, the square blocks of proper specifications may be employed. In this way, the entire optical system will have a smaller number of square blocks, and can achieve faster positioning with higher accuracy.

In the optical positioning system and method, the square blocks carrying or not carrying an optical functional assembly may be replaced with any other square blocks to achieve fast construction and reconfiguration of a light path.

In order to achieve attaching between square block and backrest bodies, between square block and bottom board or carrying board, and between square block and square block, natural attaching may be employed. But, to achieve more reliable attaching, the following different technical solutions may be employed.

In one solution, bonding may be achieved between the square block and the bottom board or the carrying board and between the square blocks by glue to achieve close attaching.

In another solution, the bottom board or the carrying board may be made of a magnetic material, (refer to a material reacting to a magnetic field in a manner, rather than a magnet itself; in the present invention, it refers to a material capable of being adsorbed by a magnet). The positioning block adopts the positioning block with a magnet embedded into the bottom surface. In this way, the reliable adsorption can be achieved between the positioning block and the bottom board or the carrying board. Further, when the positioning block adopts the positioning square block, the above magnetic material is used, and a magnet is embedded to each of the four side surfaces. The positions of the four positioning side surfaces for embedding magnets are off-centered to be at left or right side, and the polar directions of various embedded magnets are same. Thus, adjacent square blocks can be adsorbed to each other when approaching to each other, thereby realizing close attaching. The backrest body may also be made of a magnetic material to achieve close attaching of the square block and the backrest body.

IV. Functional Module Based on a Positioning Block in the Present Invention

In the above positioned light path system, the positioning blocks and the bottom board or the carrying board are fixed together to form a system of stable position, thus forming the functional module of the present invention. According to different manners in which the close attaching is achieved between the above system assemblies, the formed functional module may be as follows:

a functional module fixed by glue includes the already-positioned positioning blocks carrying or not carrying the optical assembly, and the bottom board or the carrying board bonded to the positioning block. When the positioning block is bonded to the bottom board and the backrest body and the bottom board are not separable, the functional module may further include the backrest body.

a magnetically-adsorbed functional module includes the already-positioned positioning blocks carrying or not carrying the optical assembly, and the bottom board or the carrying board magnetically adsorbed to the positioning block. When the positioning block is adsorbed to the bottom board and the backrest body and the bottom board are not separable, the functional module may further include the backrest body.

In the present invention, the limiting bottom board, backrest bodies and square blocks are made of an easily processable rigid material, and the material may be, but not limited to, stainless steel, aluminum alloy, porcelain, quartz and mono-crystalline silicon and the like. These materials are easily processable and can ensure a surface smoothness and a good wear resistance and a good stability. Integral formation with a processing technique can reduce processing errors.

In the present invention, in a case of a light emitting element, such as laser emitting element or optical fiber collimator involved, an adjusting bracket may be used or pre-fixing is performed, so as to enable a light beam emitted from the square block to be fully parallel to the bottom and the side surfaces of the square block. In this case, as long as the square blocks are closely attached to the bottom and backrest bodies, the light beam will be smoothly transmitted from one square block to another square block and received by any detector of the another square block such as the collimator or power meter. The continuous structure of the optical functional assembly and the pre-alignment of the light path can be implemented using any means in the prior arts. As required, some micro-adjustment mechanisms may be added to the square blocks to help to improve aligning accuracy and coupling efficiency.

As described above, in the present invention, the optical element of each square block can be accurately positioned quickly and conveniently by use of the close attaching between the square blocks and the backrest bodies and between the square block and the square block. The optical functional assembly on the square blocks may be fixed by an adjusting bracket or pre-adjustment, such that the light path will not change its angle and position after passing through the optical element, thereby achieving replacement and reconfiguration between any optical elements.

The present invention is particularly suitable for teaching and scientific researches. In teaching, one light path is constructed only for teaching demonstration and student practices, whereas in scientific research, one light path is constructed only for one experiment. The light path constructed herein does not need to be kept for long nor used many times repeatedly. For this, the present invention provides a solution of constructing a light path that is extremely low in cost, convenient and feasible and can be disassembled and reconfigured at any time.

Figure 1:
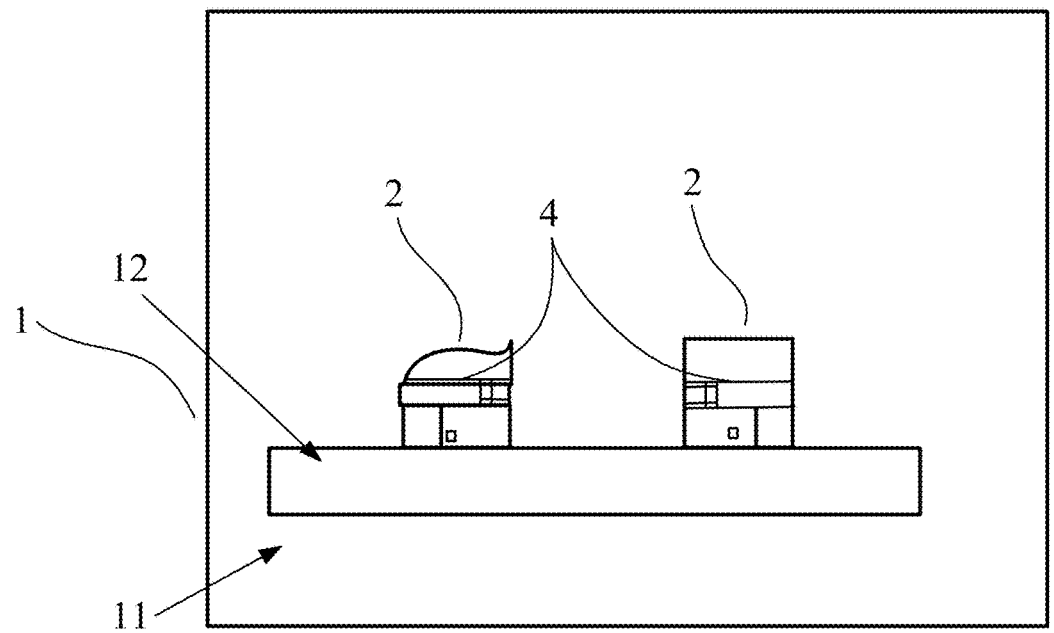
FIG. 1 is a top view of an embodiment 1 of the present invention.

In the drawings, numerals are described below: 1. positioning plate, 11. bottom board, 12 backrest body, 2. square block (positioning square block), 21. magnet, 3. carrying board, 4. collimator.

DETAILED DESCRIPTION OF THE EMBODIMENTS

In combination with the accompanying drawings, the embodiments of the present invention are described below in details. In the descriptions, a positioning block, a positioning system and method and a functional module are described in the positioning system. The optical assemblies in the embodiments are, for example, collimators, but it does not mean the optical assemblies in the present invention are limited to the collimators. The present invention may be applied to all optical assemblies positioned using the technology of the present invention.

Embodiment 1-1

Figure 2:
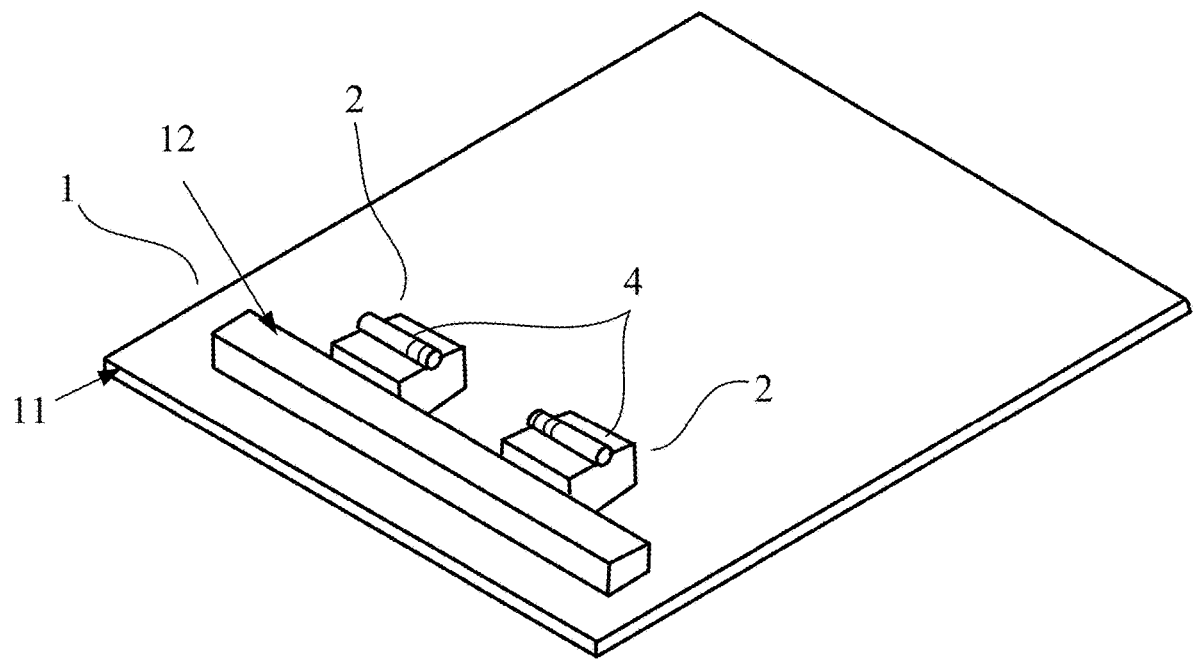
FIG. 2 is a perspective diagram of an embodiment 1 of the present invention.

As shown in FIGS. 1 and 2, provided is an optical positioning system based on a positioning block. The system includes: a positioning plate 1 and two positioning blocks 2 for positioning. The positioning plate 1 consists of a bottom board 11 with a horizontal upper surface, and a backrest body with a straight inner side as positioning side. The square block 2 includes one bottom surface and one positioning side surface. The upper surface is used to carry an optical assembly which is a collimator in the present embodiment.

The positioning method of the positioning system in this embodiment is as follows: the bottom board 11 of the positioning plate 1 is used as a positioning reference of vertical direction (height), and the positioning side of the backrest body 12 on the bottom board 11 is used as a positioning reference of two horizontal directions. The bottom surface of the positioning block is attached to the upper surface of the bottom board 11 to realize positioning of vertical direction. The positioning side surface of the positioning block is attached to the positioning side of the backrest body to realize positioning of horizontal direction. Two positioning blocks 2 carry collimators 4 mutually coupled, and an optical axes of the collimator 4 are parallel to the positioning side surfaces of respective positioning blocks 2 and equally distant from it H=h (FIG. 1). The heights of the optical axes of the collimators 4 are set to be same. In this case, the optical axes of the two collimators 4 are positioned on a same horizontal straight line which is parallel to the bottom board and the positioning side of the backrest body. As seen from the drawing, the sizes and sectional shapes of the positioning blocks in the embodiment are not required to be consistent. The important is that the optical axis of the optical assembly is parallel to the positioning side surface of the positioning block and equally distant from the positioning side surface.

In order to achieve reliable attaching and positioning of the positioning block 2 and the bottom board 11, the bottom board 11 is made of a magnetic material, and a magnet (not shown) is embedded into the bottom surface of the positioning block 2, such that the positioning block is adsorbed fixedly onto the bottom board. Alternatively, the bottom board 11 may not be made of a magnetic material, and the positioning block 2 and the bottom board 11 are fixed together by glue. After fixing is performed using any one of the above methods, the backrest body may be removed or not removed (when the backrest body and the bottom board are not separable), so as to form the functional module of the present invention.

Embodiment 1-2

Figure 5:
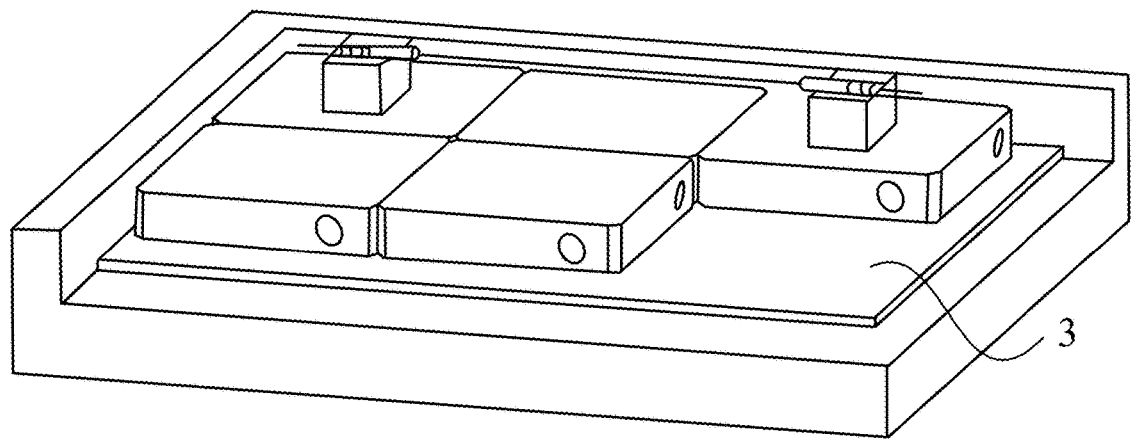
FIG. 5 is a perspective diagram of an embodiment 2-2 of the present invention.

This embodiment does not have accompanying drawings and reference may be made be made to FIG. 5 of the embodiment 2-2.

In this embodiment, the backrest body and the bottom board are not separable. It differs from the embodiment 1-1 in that a movable carrying board 3 is added on the bottom board, and one side of the carrying board 3 is attached to the positioning side of the backrest body 12. The bottom surface of the positioning block 3 is attached to the carrying board 3.

In this embodiment, the positioning plate 1 is made of a non-magnetic material and the carrying board 3 is made of a magnetic material. In this case, the square blocks 2 and the carrying board 3 are adsorbed mutually to form one piece. The square blocks 2 are not adsorbed to the positioning plate, such that the carrying board 3, the square blocks 2 and the optical functional assembly can be easily removed from the positioning plate, so as to form an independent functional module. The positioning blocks 2 and the carrying board 3 may also be fixed together by glue, such that the carrying board 3, the square blocks 2 and the optical functional assembly can be easily removed from the positioning plate, so as to form an independent functional module.

Embodiment 2-1

Figure 3:
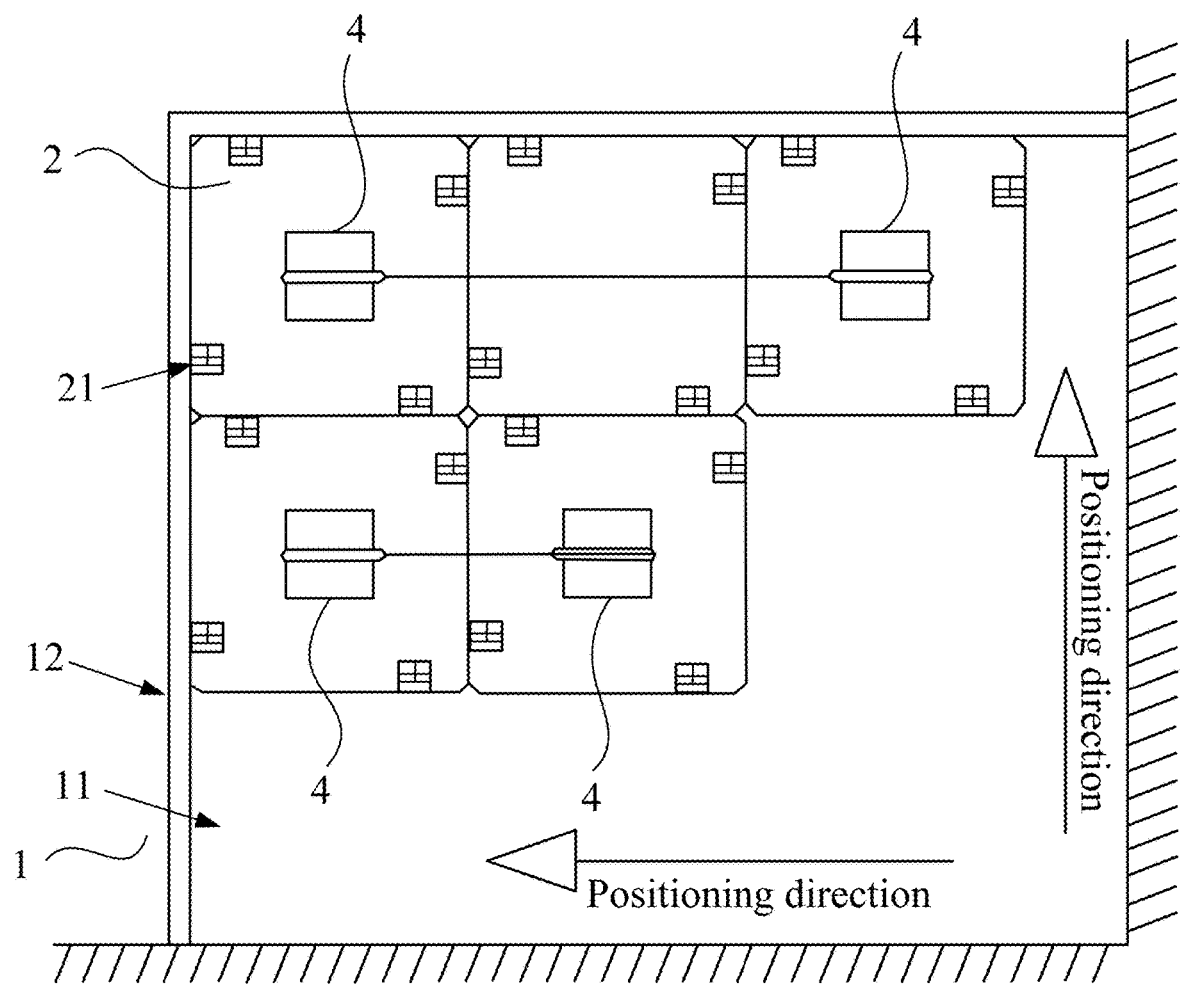
FIG. 3 is a top view of an embodiment 2-1 of the present invention.
Figure 4:
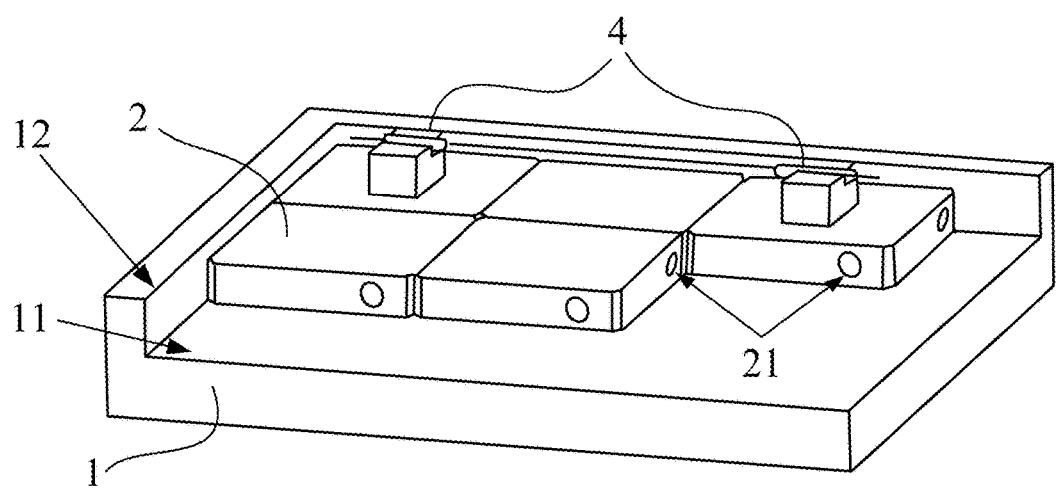
FIG. 4 is a perspective diagram of an embodiment 2-1 of the present invention.

As shown in FIGS. 3 and 4, provided is an optical positioning system based on a positioning block. The system includes a positioning plate 1 and several positioning blocks for positioning. The positioning plate 1 consists of a bottom board 11 with a horizontal upper surface, and mutually-paralleled backrest bodies 12 with straight inner sides. In the drawings, each square block 2 has a plane which is a square of same size, and the plane may also be modular-designed, namely, with a square with a minimum side length as a basic unit, the plane can be designed into a rectangle or square with a length or width being integer multiples of the minimum side length.

The square block 2 is made of a magnetic stainless steel or another magnetic material and integrally formed. A magnet 21 is embedded into each side surface of the square block 2. The magnet 21 is off-centered to be at left or right side, and polar directions of different magnets 21 are same (i.e. all are N pole or S pole externally).

The positioning method using the positioning system of the embodiment is as follows: the bottom board 11 of the positioning plate 1 is used as a positioning reference of vertical direction (height), and two side backrest bodies 12 on the bottom board 11 are used as a positioning reference of two horizontal directions. Positioning of vertical direction is implemented by closely attaching the bottom of the square block 1 to the bottom board 11, and positioning of horizontal direction is implemented by attaching the side surfaces of the square block 1 to the backrest bodies and mutually attaching side surfaces of adjacent square blocks. Because each side surface of the square block 2 is embedded with the magnet 21, adjacent square blocks 2 can be mutually adsorbed to achieve close attaching. Furthermore, because the magnet 21 in the side surface is not centered in the side surface but disposed staggeredly and the external magnetic poles of the magnets 22 are same, the square blocks can be normally adsorbed mutually when they are placed in a forward direction, thereby achieving close attaching.

The bottom board 11 and the backrest body 12 may also be made of a magnetic solid material, and a magnet is also imbedded into the bottom surface of the square block 2 (not shown). In this way, the square blocks may also be closely attached to the bottom board 11 and the backrest bodies 12 by use of magnetic adsorption.

According to different light path designs, an optical functional assembly of upper layer is carried on a square block 2 for positioning; the optical functional assemblies of upper layer enable the center points of all functional assemblies to be at a same height through a connection structure, and a light emitting assembly (for example, laser and collimator and the like) enables emitted light to be parallel to the side surface and the bottom surface of the positioning square block through mechanical adjustment, and the center points of other optical assemblies are at the same height as the emitted light. Further, by adjusting an optical fiber assembly, the light will not change its position and angle after passing through the assembly. In this case, light emitted from one light emitting assembly may smoothly enter the final optical functional assembly such as collimator and detector after passing through several optical assemblies. Various optical functional assemblies are designed such that relative to the upper surface of the square block, the light emitting or light incidence positions have the same height and the horizontal positions are also consistent. According to the requirements of light path, several square blocks carrying the optical functional assembly are placed at the corresponding positions of the square block array on the bottom board, so as to achieve basically accurate positioning of the optical system. Then, some fine adjustments are made to the optical functional assembly to achieve a desired accurate positioning (if required, some micro-adjustment mechanisms may be added to the square blocks to further improve the aligning accuracy and coupling efficiency.).

In this embodiment, a collimator 4 is taken as an example. FIG. 3 is a top view illustrating one collimator light path at the upper and lower rows respectively. FIG. 4 is a perspective diagram where the collimator of the lower row is removed from FIG. 3. As shown in FIG. 3, there are three square blocks at the upper row, there is a pair of coupled collimators 4 located on the square blocks 2 of both ends, and the square block 2 in middle does not carry an optical functional assembly but serves to lengthen the light path. A pair of coupled collimators is fixed on two adjacent square blocks at the lower row. Seen from the FIGS. 3 and 4, the square blocks 2 have same width and are aligned and attached to each other, and the coupled collimators 4 are mounted at the same position of the square blocks 2 and disposed to be opposed to each other along a direction parallel to the sides of the square blocks 2. Therefore, the coupled collimators 4 naturally achieve horizontal alignment. With the connection structure, the coupled collimators 4 are also aligned for their center points in height direction (vertical).

Embodiment 2-2

As shown in FIG. 5, this embodiment differs from the embodiment 2-1 in that a movable carrying board 3 is added to the bottom board, and two sides of the carrying board 3 which are perpendicular to each other are attached to the backrest bodies 12. The bottom surface of the square block 2 is attached to the carrying board 3.

In this embodiment, the positioning plate 1 is made of a non-magnetic material and the carrying board is made of a magnetic material. In this case, the square blocks 2 and the carrying board 3 are adsorbed to each other to form one piece, and no adsorption is present between the carrying board 3 and the positioning plate. In this way, the carrying board 3, the square blocks 2 and the optical functional assembly can be wholly removed from the positioning plate to form an independent functional module.

Embodiment 3-1

Figure 6:
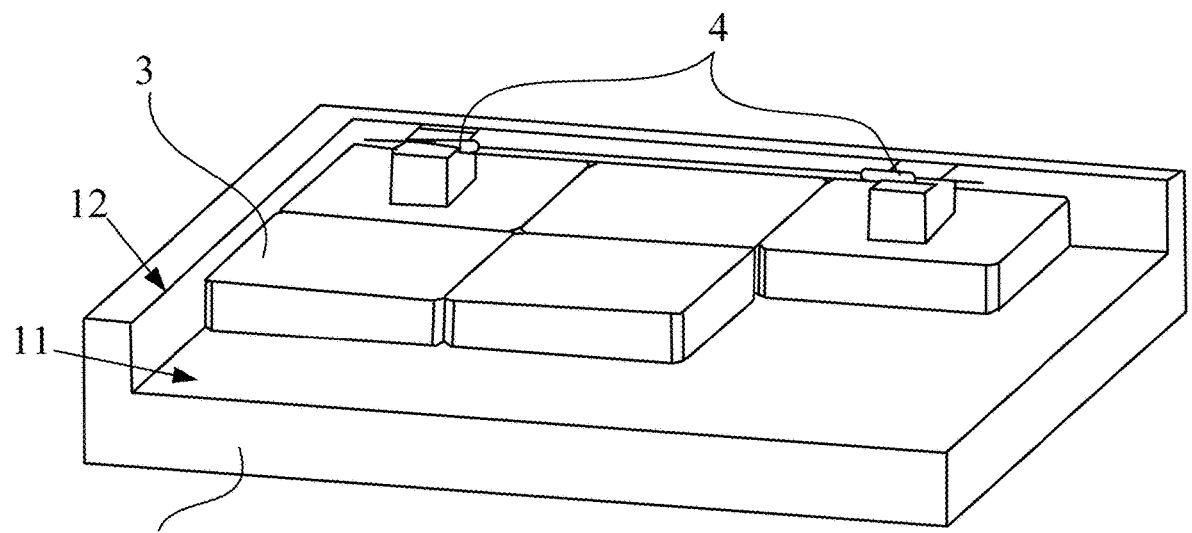
FIG. 6 is a perspective diagram of an embodiment 3-1 of the present invention.

As shown in FIG. 6, this embodiment differs from the embodiment 2-1 in that the square block 2 does not have magnet. The close attaching of the square blocks 2 is achieved by glue bonding. Further, the square blocks may also be closely attached to the backrest bodies and the bottom board by glue.

This embodiment is mainly used in a light path using a super-miniature optical functional assembly. The square block 2 required herein has a very small volume and therefore it is difficult to process another structure thereon. Of course, this structure may also be applied to the square blocks 2 of different sizes, and not limited to a very small size. The glue may be a degradable or dissolvable glue to facilitate secondary dismounting and reassembly. This structure will bring the following advantages: (1) material selection is freer and a metal or non-metal material which is difficult to deform and easy to process may be selected, such as aluminum alloy, quartz, mono-crystalline silicon and porcelain; (2) after being fixed with glue, the bonded square blocks may be wholly removed from the positioning plate 1 to form an independent small module; or, the positioning plate 1 and the square blocks 2 which are bonded to form a large piece and the light path form an independent small module entirely.

The carrying and pre-alignment of the optical functional assembly are same as the embodiment 1-1. FIG. 6 is also described with the coupled collimators 4 as an example, as in FIG. 5 and is same as the embodiment 1-1. Therefore, no redundant descriptions are made herein.

Embodiment 3-2

Figure 7:
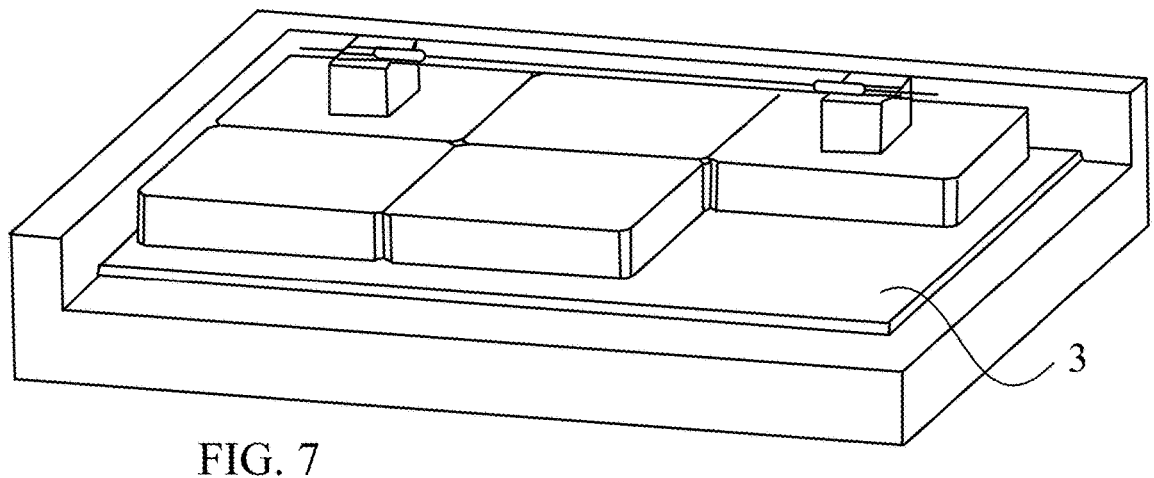
FIG. 7 is a perspective diagram of an embodiment 3-2 of the present invention.

As shown in FIG. 7, this embodiment differs from the embodiment 3-1 in that a movable carrying board 3 is added to the bottom board and two sides of the carrying board 3 which are perpendicular to each other are attached to the backrest bodies 12. The bottom surface of the square block 2 is attached to the carrying board 3. Glue bonding is performed between the square blocks 2 and between the square block 2 and the carrying board. After fixing is performed with glue, the carrying board 3, the square blocks 2 and the optical functional assembly can be removed wholly from the positioning plate to form an independent functional module.

The invention claimed is:

1. An optical positioning system based on a positioning block, comprising a bottom board with a horizontal upper surface, at least one backrest body and two or more positioning blocks for carrying and positioning an optical functional component, wherein the at least one backrest body and the bottom board are fixed together or not, the at least one backrest body has a first straight positioning side, and the positioning block comprises a bottom surface, an upper surface for carrying the optical functional component, and at least one positioning side surface; at least one positioning side surface of the positioning block being attached to the first straight positioning side of the at least one backrest body,
   wherein the at least one backrest body has a second straight positioning side perpendicular to the first straight positioning side and the first and second straight positioning sides are located on the at least one backrest body or different backrest bodies,
   wherein the positioning block is a square block structure, the side surfaces of the square block structure of the positioning block are perpendicular to the bottom surface and attached to the straight positioning sides of the at least one backrest body or the side surfaces of different square block structures of the two or more positioning blocks, top surfaces of at least one of the square block structures carry the optical functional component, a horizontal section of the square block structure is a rectangle, and horizontal sections of different square block structures are the same in size or modular-designed into rectangles of different sizes,
   wherein the square block structure is made of a magnetic material and a magnet is embedded into each of four side surfaces respectively.

2. The optical positioning system of claim 1, wherein the at least one backrest body and the bottom board are fixed together, a carrying board is present on the bottom board, and a side of the carrying board is attached to the at least one straight positioning side of the at least one backrest body.

3. The optical positioning system of claim 1, wherein the bottom board is made of a magnetic material and a magnet is embedded into the bottom surface of the positioning block.

4. The optical positioning system of claim 2, wherein the carrying board is made of a magnetic material and a magnet is embedded into the bottom surface of the positioning block.

5. The optical positioning system of claim 1, wherein the positioning block has at least two positioning side surfaces perpendicular to each other.

6. The optical positioning system of claim 1, wherein a position of each magnet embedded into each of the four side surfaces of the square block structure is off-centered to a left or a right side, and polar directions of different embedded magnets are the same.

7. The optical positioning system of claim 1, wherein the positioning block is closely attached to the bottom board or a carrying board by glue.

8. The optical positioning system of claim 1, wherein close attaching is achieved between adjacent square block structures, and between the square block structures and the bottom board or a carrying board by glue.

9. A method of positioning an optical system based on a positioning block, wherein vertical positioning is achieved by closely attaching a bottom portion of two or more positioning blocks to a bottom board or a carrying board, and horizontal positioning is achieved by closely attaching a side surface of the positioning block to at least one backrest body; according to different light path designs, at least one optical functional assembly is carried on a square block for positioning; center points of all functional assemblies are enabled to be at a same height through a connection structure, and a light emitting assembly enables emitted light to be parallel to sides and a bottom surface of the positioning square block through mechanical adjustment, and center points of other optical functional assemblies have the same height as the emitted light,
   wherein the at least one backrest body has a first straight positioning side and a second straight positioning side perpendicular to the first straight positioning side and the first and second straight positioning sides are located on the at least one backrest body or different backrest bodies,
   wherein the positioning block is a square block structure, the side surfaces of the square block structure of the positioning block are perpendicular to the bottom surface and attached to the straight positioning sides of the at least one backrest body or the side surfaces of different square block structures of the two or more positioning blocks, top surfaces of at least one of the square block structures carry at least one optical functional assembly, a horizontal section of the square block structure is a rectangle, and horizontal sections of different square block structures are the same in size or modular-designed into rectangles of different sizes,
   wherein the square block structure is made of a magnetic material and a magnet is embedded into each of four side surfaces respectively.

10. The method of claim 9, wherein fixing is achieved between the positioning block and the bottom board or the carrying board and between the positioning blocks by magnetic adsorption.

11. The method of claim 9, wherein fixing is achieved between the positioning block and the bottom board or the carrying board and between the mutually attached positioning blocks by glue.

* * * * *